United States Patent [19]

Starkston et al.

[11] Patent Number: 4,539,189

[45] Date of Patent: Sep. 3, 1985

[54] METHOD FOR REMOVING SULFIDES FROM INDUSTRIAL GAS

[75] Inventors: Robert Starkston, San Rafael; Mark C. Luce, Vallejo; Robert V. Homsy, Orinda, all of Calif.

[73] Assignee: Chevron Research Company, San Francisco, Calif.

[21] Appl. No.: 573,242

[22] Filed: Jan. 23, 1984

[51] Int. Cl.$^3$ .................... C01B 17/16; C01B 31/20; C01C 3/00
[52] U.S. Cl. .................... 423/220; 423/226; 423/228; 423/229; 423/245; 423/563
[58] Field of Search ............ 423/242 A, 242 R, 243, 423/228, 229, 220, 226, 245, 563

[56] References Cited

U.S. PATENT DOCUMENTS

| | | | |
|---|---|---|---|
| 3,767,766 | 10/1973 | Tjoa et al. | 423/220 |
| 4,112,051 | 9/1978 | Sartori et al. | 423/228 |
| 4,217,231 | 8/1980 | Sartori et al. | 423/228 |

*Primary Examiner*—Gregory A. Heller
*Attorney, Agent, or Firm*—S. R. LaPaglia; J. W. Ambrosius; E. A. Schaal

[57] ABSTRACT

Process and composition for removing $H_2S$ and like sulfides from gas streams by contact with a substituted aromatic nitrile having an electron-attracting substituent on the aromatic ring at least as strong as halogen (e.g., isophthalonitrile) and an organic tertiary amine in an inert organic solvent such as N-methyl-2-pyrrolidone.

11 Claims, No Drawings

METHOD FOR REMOVING SULFIDES FROM INDUSTRIAL GAS

BACKGROUND OF THE INVENTION

Various methods are available to remove hydrogen sulfide ($H_2S$) and carbon dioxide ($CO_2$) from natural gas. One promising method which has not achieved practical success is disclosed in U.S. Pat. No. 3,767,766. In carrying out this process, the natural gas stream is contacted with a solution containing an aromatic nitrile and an alkali hydrosulfide in a substantially hydroxyl-free solvent such as N-methyl-2-pyrrolidone. The solution is regenerated by mild heating and/or pressure reduction to remove the $CO_2$. The $H_2S$ is removed by heating the remaining solution.

Although having an advantage over other known processes for removing $H_2S$ and $CO_2$ from natural gas, the process described in U.S. Pat. No. 3,767,766, herein incorporated by reference, has some significant practical problems. Experience indicates that the alkali hydrosulfide, which acts as a catalyst for the reaction of the $H_2S$ with the nitrile, is prone to form an insoluble bicarbonate with the $CO_2$ and trace amounts of water and to precipitate out of solution. In addition, the alkali hydrosulfide catalyzes the nitrile hydrolysis, causing a general deterioration in solution quality. The present invention is directed to the replacement of the alkali hydrosulfide with a different catalyst to overcome these undesirable side reactions.

SUMMARY OF THE INVENTION

In carrying out the process that is the present invention, the alkali hydrosulfide catalyst is replaced with an organic tertiary amine or a mixture of organic tertiary amines. Thus, in its broadest aspect, the present invention is directed to a process for removing a sulfide from a moist or dry gas stream containing a sulfide which comprises contacting the gas stream with a sorbent solution for a time sufficient to sorb a desired quantity of the sulfide from the gas stream, the sorbent solution containing at least 0.1 weight percent, based on the solvent, of an aromatic nitrile containing an electron-attracting substituent on the aromatic ring, said substituent having an attraction for electrons which is at least as strong as that of a halogen substituent, said solution further containing an effective catalytic amount of an organic tertiary amine, a mixture of organic tertiary amines, or a hydrosulfide derivative thereof, the amount of said tertiary amine present being at least 0.01 gram mol per gram equivalent of the nitrile, the solvent of said sorbent solution being an inert liquid solvent; separating the resulting sulfide-enriched solution from the resulting sulfide-reduced gaseous mixture; heating the sulfide-enriched solution to regeneration temperature; and recovering separately regenerated sorbent solution and sulfide product.

The present invention is further directed to a liquid sorbent solution useful for removing a sulfide from a moist or dry gas stream which comprises:
 (a) an inert liquid solvent;
 (b) at least 0.1 weight perent, based on the solvent, of an aromatic nitrile containing an electron-attracting substituent on the aromatic ring, said substituent having an attraction for electrons which is at least as strong as that of a halogen substituent; and
 (c) an effective catalytic amount of an organic tertiary amine, a mixture of organic tertiary amines, or a hydrosulfide derivative thereof, said tertiary amine being present in an amount of at least 0.01 gram mol per gram equivalent of the nitrile.

The present process and composition of matter offer several advantages over the process described in U.S. Pat. No. 3,767,766. Unlike the alkali hydrosulfide, the organic tertiary amine does not promote the undesirable side reactions observed in the prior art process. More specifically, the tertiary amine does not form a precipitate during operation nor does the tertiary amine promote hydrolysis of the nitrile. Thus, significantly less degradation of the sorbent solution results.

The process described herein can be advantageously used to remove hydrogen sulfide and hydrocarbon derivatives thereof such as mercaptans, monosulfides, and disulfides. Normally, these derivatives will be lower molecular weight alkyl mercaptans and sulfides. The feeds to the process, including the contaminating sulfides, preferably have boiling ranges similar to natural gas, i.e., are gaseous at standard conditions.

The solvent employed in preparing the sorbent solution is described as an inert liquid solvent which preferably is substantially anhydrous. This refers to a solvent which is essentially inert during the contacting and regeneration steps to the reaction products as well as to the selected nitrile and organic tertiary amine. The solvent should be able to hold in solution the selected aromatic nitrile and tertiary amine as well as the reaction products of the feed with the sorbent solution. Also the solvent should be thermally stable at the conditions of use. Particularly preferred are polar aprotic solvents such as N-methyl-2-pyrrolidone. The phrase "substantially anhydrous" refers to less than 1.0 weight percent of water being present in the solvent.

DETAILED DESCRIPTION OF THE INVENTION

The substituted aromatic nitriles employed in the contacting solution of the present process are those which have a relatively high chemical reactivity toward $H_2S$ and similar organic sulfides. These are the aromatic nitriles having one or more electron-attracting substituents on the aromatic ring at least as strong as a halogen substituent. In some instances, particularly with chloro substituents, higher activity is obtained with said electron-attracting substituent in the ortho position. Suitable electron-attracting substituents include CN, COOH, Cl, Br, I, F and the like. Hence, suitable substituted aromatic nitriles include para-iodo benzonitrile, ortho-iodo benzonitrile, para-bromo benzonitrile, meta-bromo benzonitrile, para-chloro benzonitrile, ortho-chloro benzonitrile, and isophthalonitrile (i.e., meta-cyano benzonitrile). Derivatives of such substituted aromatic nitriles may also be employed provided that the additional groups, such as methyl ring substituents, do not interfere (e.g., by steric hindrance) with the desired reaction, and further, provided the additional substituents do not negate the electron-attracting force of the activating substituent. Isophthalonitrile is preferred in view of its high reactivity, high capacity (due to the presence of two cyano groups which can react with $H_2S$), regenerability of its reaction products, solubility and thermal stability. For example, 15 weight percent isophthalonitrile in anhydrous N-methyl-2-pyrrolidone has a crystallization point of $-5°$ F.

Sufficient substituted aromatic nitrile is brought into contact with the sulfide-containing feed to react with at least an appreciable proportion of the sulfides present. In continuous contacting systems, the feed rate, the contact time, the rate of circulation of contacting solution and the concentration of nitrile in the contacting solution all bear on the ratio of nitrile to sulfide. Ideally for complete sulfide reaction, a stoichiometric ratio of nitrile to $H_2S$ (or equivalent S compound to be reacted) would be used, but practically an excess is normally used. The stoichiometric ratio is defined as one gram equivalent of nitrile on a cyano group basis for each gram equivalent of sulfide to be reacted. While it is usually preferable to exceed the stoichiometric ratio of nitrile groups to sulfide, sometimes it may be economical, particularly with high $H_2S$ partial pressures (due to high total pressure or high $H_2S$ content), to use a lower ratio, whereby part of the sulfide loading capacity of the sorbent solution will depend upon the solvent selected. In general, the concentration of nitrile in the contacting solution may vary from 0.1 weight percent up to the solubility limit, preferably in the higher ranges for maximum sulfide loading of the contacting solution. For example, when using N-methyl-2-pyrrolidone as the solvent, about 15% isophthalonitrile is preferred.

In order to increase the reaction of the sulfides with the reagents in the sorbent solution, it is preferred that the solvents have the property of readily absorbing or rapidly dissolving the $H_2S$ or other sulfides to be removed from the feed. To minimize losses throughout the processing cycle, it is preferred that the solvent has a relatively low volatility. Suitable solvents include N-substituted pyrrolidones such as N-methyl-2-pyrrolidone (m.p.$=-12°$ F.), piperidones, cyclotetramethylene sulfones such as sulfolane and dimethyl sulfolane, lower alkylene carbonates such as propylene carbonate, benzonitrile, dialkyl ethers of polyethylene glycol, such as 1,2-bis[2-methoxyethoxy]ethane (triglyme) or bis[2-(2-methoxyethoxy)ethyl]ether (tetraglyme), and mixtures thereof. Solvents having high solvent power or good affinity for $H_2S$ are generally preferred. Of these, N-methyl-2-pyrrolidone is especially preferred because of its affinity for $H_2S$, low crystallization point, low vapor pressure and dissolving power for the reagent and reaction product. An additional difference between the present process and the prior art process disclosed in U.S. Pat. No. 3,767,766 is that the solvent need not be hydroxyl-free. Unlike the alkali hydrosulfide used in the prior art process, the tertiary amine will not react with hydroxyl groups in the solvent and interfere with the process.

As noted above, the catalyst used in the present process is an organic tertiary amine or a mixture of organic tertiary amines. The organic substitutions on the amine may be any of the known organic moieties which may be used to replace the hydrogen atoms on the amine, such as for example, alkyl, alkanol, alkenyl, cycloalkyl, aryl, and the like. Heterocyclic compounds containing one or more tertiary amines either in the ring structure or as substitutions on the ring have also been found to be useful in carrying out the process of the invention. Thus, suitable tertiary amines include triethanolamine, triisopropanolamine, methyldiethanolamine, dimethylethanolamine, N,N-dimethyldodecylamine, 1,4-diazabicyclo[2.2.2]octane, 2-methyl-1,4-diazabicyclo[2.2.2]-octane, 2,4,6-tris(dimethylaminoethylmethyl)phenol, and 2-tris(dimethylaminoethylmethyl)phenol. Of the tertiary amines tested, 2-methyl-1,4-diazabicyclo[2.2.2]octane is particularly preferred as a catalyst. It may be desirable to use a mixture of two or more tertiary amines such as, for example, a mixture of 2-methyl-1,4-diazabicyclo[2.2.2]octane and dimethylethanolamine. Under some conditions it has been found that mixtures of the tertiary amines may be beneficial to the operation of the regenerator by modifying the solution boiling point and preventing the formation of a solid amine hydrosulfide derivative in the overhead condenser.

Although the mechanism of the present invention is not known, it is theorized that the tertiary amine associates with sulfide in situ to form a hydrosulfide derivative of the tertiary amine. It is theorized that the nitrile group reacts with the sulfide to form a thioamide. The hydrosulfide anion derived from the association of the $H_2S$ with the tertiary amine initiates this reaction by forming an intermediate with the carbon atom in the nitrile group. However, since all of these species have not been identified, the exact mechanism is subject to speculation. Therefore, the present invention is not limited to any particular mechanism or set of chemical reactions.

The amount of the tertiary amine in the sorbent solution is given as an effective catalytic amount, i.e., an amount sufficient to catalyze the reaction between the nitrile and the sulfide. As a minimum, the sorbent solution should contain at least 0.01 gram mol of the tertiary amine per gram equivalent of the nitrile. Generally, the upper limit on the amount of organic tertiary amine is determined by the solubility of the components in the contacting solution. In practice, the amount of the preferred organic tertiary amine will usually not exceed about 0.5 gram mol per gram equivalent of the nitrile.

As indicated above, the process is especially applicable to the preferential removal of $H_2S$ from admixtures of light hydrocarbons such as $C_1-C_5$ hydrocarbons, carbon dioxide and $H_2S$. A special feature of the present invention is the substantial removal of $H_2S$ from such gaseous admixtures so that, for example, natural gas (predominantly methane) containing relatively small amounts of $H_2S$ (e.g., 0.25 to 100 grains of $H_2S$ per 100 SCF) can be efficiently treated to produce a pipeline specification gas of less than 0.25 grain of $H_2S$ per 100 SCF even when the sour natural gas stream is at atmospheric or subatmospheric pressure. (One grain $H_2S$ per 100 SCF is equivalent to 15.9 ppm by volume and 22.88 $mg/m^3$).

While the process has special application to treating gases having the foregoing dilute $H_2S$ content, the process can be applied advantageously to the selective removal of $H_2S$ and like sulfides from fluids having higher concentrations of these undesirable sulfides. In addition to natural gas, other suitable feed streams include industrial gas streams (such as obtained in oil refinery operations) as well as flue gases, flue gases and hydrogen gas streams contaminated with sulfides. A particular application is for the selective removal of $H_2S$ from Claus furnace tail gases, where the Claus furnace is run under conditions to leave some unconverted $H_2S$ in the tail gas.

Preferably the feed gas is substantially free of solids such as elemental sulfur as well as oxidizing agents, such as oxygen, air, CO or $SO_2$ which, under operating conditions, may convert $H_2S$ contained in the gaseous feed to elemental sulfur. If the feed gas is found to contain significant amounts of oxygen or other oxidizing agents, the feed gas is preferably hydrogenated to convert the oxidizing agents to components which are inert to the process described herein. Such freedom from elemental sulfur and oxygen is especially preferred with reagent solutions comprising pyrrolidones, such as N-methyl-2-pyrrolidone. Oxygen (or equivalent oxidizing agents) is undesirable because it forms elemental sulfur in the solution. The dissolved sulfur can in turn react with the pyrrolidones as described in U.S. Pat. No. 3,306,911, especially at the higher regeneration temperatures. Normally, it is desirable to have the feed contain less than 0.5% oxygen (or an equivalent amount of other oxidizing agents), most preferably less than 0.01% oxygen. Where elemental sulfur is present in the feed, or is formed by oxidation, in quantities tending to deposit out in the treating system or otherwise interfere with the process, suitable solid separators, such as filters, centrifuges, or gas-liquid dust separators, may be introduced at appropriate points to remove the solid sulfur. Likewise, crystallizers, such as cooling tanks and settlers, may be employed to precipitate out incipient solids, such as dissolved elemental sulfur from the process liquid.

In some instances, it is desirable to have the feed substantially dry; however, the process can be applied satisfactorily to moist gases. Usually, it is preferable to dehydrate the feed and most desirably with a dehydrating agent that does not carry over into the sulfide removal system or that, if so carried over, does not adversely affect the sorbent solution in the sulfide removal system. A particularly advantageous arrangement is to use the pyrrolidones as the solvent in the sorbent solution of the sulfide removal system and to use the same pyrrolidone in a pretreatment stage of contacting to dehydrate the feed gas. If there is any carryover of pyrrolidone from the dehydrating pretreatment, the pyrrolidone does not adversely affect the sulfide removing solution and can be easily recovered. N-methyl-2-pyrrolidone has been found to be an excellent dehydrating liquid.

The process of this invention can be carried out using contacting procedures conventional in absorption methods wherein the sulfide-containing feed is contacted with the sorbent solution either batchwise or countercurrently or co-currently. While batchwise contacting can be used, it is preferred to contact the sulfide-containing feed in a countercurrent absorption tower with the sorbent solution in a continuous flow method. Suitable bubble cap or perforated trays, or packing such as raschig rings or berl saddles, or other means of insuring adequate and efficient contacting can be provided. Carbon dioxide and light hydrocarbons which become absorbed in the solvent of the sorbent solution are preferably first rejected in one or more stages of flashing accomplished by reducing the pressure on the solution. A substantial portion of the aromatic and heavier hydrocarbons absorbed by the solvent may be rejected by simultaneously or subsequently increasing the temperature of the sorbent solution to a value not exceeding the decomposition temperature of the reaction products and venting the resulting vapors. Thereafter, the spent contacting solution is preferably regenerated by additional heating to raise the temperature of the solution above the decomposition temperature of the reaction products, thereby dissociating the reaction products and effectively separating the sulfides from the liquid phase sorbent solution.

In some instances, such as when processing gases of relatively low $H_2S$ concentrations (e.g., $\frac{1}{2}$ mole % $H_2S$ or less), it may be preferable to partially regenerate the spent sorbent solution by a simple heat and flash cycle.

In most instances, and particularly when processing gases containing relatively high concentrations of $H_2S$ (e.g., 1 mole % $H_2S$ or higher), it is preferable to use a conventional reboiled stripping column for regenerating the spent sorbent solution, thereby obtaining more complete regeneration. In other instances, and particularly when the sorbent solution contains a component which degrades appreciably at the normal boiling point of the sorbent solution, the spent sorbent solution may be regenerated by heating together with an inert gas such as nitrogen, methane, and the like. Also, sorbent solutions which contain components that degrade appreciably at the normal boiling point of the sorbent solution may be regenerated by introducing an inert thermally stable liquid of increased volatility, e.g., benzonitrile, xylene, paraffinic hydrocarbons, and the like, into the reboiler zone and recovering the more volatile solvent in an overhead condenser for recirculation back to the reboiler zone. Regeneration time (i.e., residence time of the enriched sorbent solution) depends inter alia upon the method of contacting, stripping vapor rate, temperature, pressure, the nature and composition of the solution, and the amount of reaction products.

The contacting step of the process is generally carried out at temperatures above that sufficient to maintain solubility of the several components of the sorbent solution as well as the reaction products. The maximum temperature in the contacting zone should be that which is below the temperature at which the desired reaction of the sulfides with the nitrile is reversed. Usually the temperature will be in the range from about $-5°$ F. to no more than 250° depending upon the composition of the selected sorbent solution. The pressures in the contacting step will be those which are practical such as from subatmospheric to 2000 psig. Desirably, the feed and sorbent solution are brought together in continuous operations and at conditions which depend upon the sulfide content of the feed, the desired purity of product and the nature of the sorbent solution.

After the desired rejection of dissolved $CO_2$ and hydrocarbons, such as by flashing at reduced pressure, the contacting solution is regenerated. The regeneration is carried out at higher temperatures than those used in the contacting step for the same sorbent solution. Generally, the temperature of regeneration will be the minimum required to obtain dissociation of the sulfide from the sorbent solution within a reasonable period of time and the pressure may be from subatmospheric to superatmospheric. Usually the regeneration pressure is below 100 psig, and preferably in the range of 0 to 20 psig. When the $H_2S$ or equivalent sulfide goes to a Claus furnace, the regeneration is usually carried out at about 20 psig. The maximum temperature for regeneration is limited to prevent excessive loss or degradation of the components of the sorbent solution. In most instances the regeneration temperature will be above 200° F. For example, at atmospheric pressure and with an original concentration of 7.5 weight percent of isophthalonitrile, the regeneration temperature will be in the range of 250° to 400° F. when the solvent is N-methyl2-pyrrolidone and 200° to 325° F. when the solvent is a mixture of sulfolane and dimethyl sulfolane.

As indicated above, $H_2S$ released in the regeneration of the sorbent solution can be introduced into a Claus plant for conversion to sulfur, and this combination of steps is particularly desirable. Also, the $H_2S$ can be converted to sodium sulfide by contacting with an aqueous caustic solution.

Since the present invention involves a selective reaction of H₂S and like sulfides with the substituted aromatic nitriles, the process can be used to remove all or any portion of the sulfide content of the feed. Thus, the process applies to removal of $H_2S$ in any concentration from $H_2S$-containing gases and is particularly applicable to purification of gases having low partial pressures of $H_2S$ such as below 0.1 psi of $H_2S$. Thus, the process can remove sufficient $H_2S$, i.e., so the gas meets pipeline specification (0.25 grains $H_2S$/100 SCF of gas) or can remove all the $H_2S$. Although the process can be used to remove effectively $H_2S$ from gases containing little or no other acidic components, the process is especially effective in selectively removing $H_2S$ from gases containing appreciable amounts of $CO_2$.

What is claimed is:

1. A process for removing a sulfide from a moist or dry gas stream containing a sulfide which comprises contacting the gas stream with a sorbent solution for a time sufficient to sorb a desired quantity of the sulfide from the gas stream, the sorbent solution containing at least 0.1 weight percent, based on the solvent, of an aromatic nitrile containing an electron-attracting substituent on the aromatic ring, said substituent having an attraction for electrons which is at least as strong as that of a halogen substituent, said solution further containing an effective catalytic amount of an organic tertiary amine, a mixture of organic tertiary amines, or a hydrosulfide derivative thereof, the amount of said tertiary amine present being at least 0.01 gram mol per gram equivalent of the nitrile, the solvent of said sorbent solution being an inert liquid solvent; separating the resulting sulfide-enriched solution from the resulting sulfide-reduced gaseous mixture; heating the sulfide-enriched solution to regeneration temperature; and recovering separately regenerated sorbent solution and sulfide product.

2. The process of claim 1 wherein the organic tertiary amine or mixture of organic tertiary amines is selected from the group consisting of triethanolamine, triisopropanolamine, methyldiethanolamine, dimethylethanolamine, N,N-dimethyldodecylamine, 1,4-diazabicyclo[2.2.2]octane, 2-methyl-1,4-diazabicyclo[2.2.2]octane, 2,4,6-tris(dimethylaminomethyl)phenol, and 2-tris(dimethylaminomethyl)phenol.

3. The process of claim 2 wherein the organic tertiary amine 2-methyl-1,4-diazabicyclo[2.2.2]octane or a hydrosulfide derivative thereof is present in the sorbent solution.

4. The process of claim 2 wherein the sorbent solution contains a mixture of tertiary amines.

5. The process of claim 4 wherein the sorbent solution contains a mixture of 2-methyl-1,4-diazabicyclo[2.2.2]octane and dimethylethanolamine.

6. The process of claim 1 wherein the solvent is substantially anhydrous.

7. The process of claim 1 wherein the sorbent solution contains a solvent selected from the group consisting of N-substituted pyrrolidone, piperidone, cyclotetramethylene sulfone, lower alkylene carbonate, benzonitrile, and dialkyl ethers of polyethylene glycol.

8. The process of claim 7 wherein the inert solvent is N-methyl-2-pyrrolidone.

9. The process of claim 1 wherein the nitrile is isophthalonitrile.

10. The process of claim 1 wherein the sulfide removed from the gas stream is hydrogen sulfide.

11. The process of claim 1 wherein the gas stream also contains carbon dioxide which is removed by the process.

* * * * *